United States Patent
Alon

(10) Patent No.: US 10,778,407 B2
(45) Date of Patent: Sep. 15, 2020

(54) MULTIPLIER PROTECTED AGAINST POWER ANALYSIS ATTACKS

(71) Applicant: NUVOTON TECHNOLOGY CORPORATION, Hsinchu (TW)

(72) Inventor: Moshe Alon, Tel-Aviv (IL)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 271 days.

(21) Appl. No.: 15/935,004

(22) Filed: Mar. 25, 2018

(65) Prior Publication Data

US 2019/0296891 A1 Sep. 26, 2019

(51) Int. Cl.
*H04L 9/00* (2006.01)
*G06F 7/544* (2006.01)

(52) U.S. Cl.
CPC ............ *H04L 9/003* (2013.01); *G06F 7/5443* (2013.01); *H04L 2209/08* (2013.01)

(58) Field of Classification Search
CPC .................. H04L 9/003; H04L 2209/08; H04L 2209/046; H04L 9/0891; G06F 7/5443; G06F 2207/7238; G06F 7/764; G06F 7/523; G06F 21/60; G06F 21/554
See application file for complete search history.

(56) References Cited

U.S. PATENT DOCUMENTS

| | | | |
|---|---|---|---|
| 6,049,865 A | 4/2000 | Smith | |
| 9,544,131 B2* | 1/2017 | Karroumi | G06F 7/727 |
| 10,025,559 B2* | 7/2018 | Diop | G06F 7/723 |
| 10,367,637 B2* | 7/2019 | Xiao | G06F 21/755 |
| 10,439,796 B2* | 10/2019 | Wurcker | H04L 9/002 |
| 10,474,431 B2* | 11/2019 | Dyka | H04L 9/003 |
| 2006/0055569 A1 | 3/2006 | Tomic | |
| 2006/0285682 A1 | 12/2006 | Sarangarajan et al. | |
| 2013/0262544 A1* | 10/2013 | Lee | G06F 7/533 708/250 |
| 2013/0332707 A1 | 12/2013 | Gueron et al. | |
| 2014/0281573 A1 | 9/2014 | Jaffe | |

(Continued)

FOREIGN PATENT DOCUMENTS

| | | |
|---|---|---|
| AU | 2011232817 A1 | 5/2013 |
| CA | 2754370 A1 | 4/2013 |
| CN | 101271570 A | 9/2008 |

*Primary Examiner* — Michael R Vaughan
(74) *Attorney, Agent, or Firm* — Kligler & Associates Patent Attorneys LTD

(57) ABSTRACT

A multi-word multiplier circuit includes an interface and circuitry. The interface is configured to receive a first parameter X including one or more first words, and a second parameter Y' including multiple second words. The second parameter includes a blinded version of a non-blinded parameter Y that is blinded using a blinding parameter $A_Y$ so that $Y'=Y+A_Y$. The circuitry is configured to calculate a product $Z=X \cdot Y$ by summing multiple sub-products, each of the sub-products is calculated by multiplying a first word of X by a second word of Y', and subtracting from intermediate temporary sums of the sub-products respective third words of a partial product $P=X \cdot B_Y$, $B_Y$ is a blinding word included in $A_Y$.

15 Claims, 3 Drawing Sheets

(56) References Cited

U.S. PATENT DOCUMENTS

2015/0293698 A1 10/2015 Lu et al.
2016/0179470 A1 6/2016 Gueron et al.
2016/0378715 A1 12/2016 Kang et al.

* cited by examiner

MULTIPLIER PROTECTED AGAINST POWER ANALYSIS ATTACKS

TECHNICAL FIELD

Embodiments described herein relate generally to secure computing systems, and particularly to methods and systems for protecting against power analysis attacks.

BACKGROUND

Power analysis attacks are attacks in which the attacker monitors variations in the power consumption of a hardware device during its operation for extracting cryptographic keys and other secret information from the device. Differential Power Analysis (DPA) is a power analysis method that allows an attacker to extract secret information during the computation of cryptographic computations via statistical analysis of the power consumed over multiple cryptographic operations.

Power analysis attacks are typically non-invasive and therefore hard to detect. A general approach to protect against power analysis attacks such as DPA is to design the hardware so that power consumption variations do not reveal secret information.

SUMMARY

An embodiment that is described herein provides a multi-word multiplier circuit that includes an interface and circuitry. The interface is configured to receive a first parameter X including one or more first words, and a second parameter Y' including multiple second words. The second parameter includes a blinded version of a non-blinded parameter Y that is blinded using a blinding parameter $A_Y$ so that $Y'=Y+A_Y$. The circuitry is configured to calculate a product $Z=X \cdot Y$ by summing multiple sub-products, each of the sub-products is calculated by multiplying a first word of X by a second word of Y', and subtracting from intermediate temporary sums of the sub-products respective third words of a partial product $P=X \cdot B_Y$, $B_Y$ is a blinding word included in $A_Y$.

In some embodiments, the circuitry is configured to consume electrical power provided thereto over one or more power-supply inputs, while rendering the non-blinded parameter Y irrecoverable from sensing of the power-supply inputs during calculation of the product. In other embodiments, the blinding parameter $A_Y$ includes a number of bits larger than a number of bits in the non-blinded parameter Y. In yet other embodiments, the blinding parameter $A_Y$ includes a sum of the blinding word $B_Y$ and at least a shifted version of $B_Y$.

In an embodiment, the circuitry is configured to calculate a blinded version $Z'=Z+A_Z$ of the product Z, using a respective product blinding parameter $A_Z$, by adding to a sub-product of a first word of X by a second word of Y', a blinding word extracted from $A_Z$. In another embodiment, the circuitry is configured to accumulate the sub-products and to subtract the third words of the partial product in an interleaved and permuted order that does not reveal intermediate results produced in a direct product calculation.

In some embodiments, the circuitry is configured to update the blinded parameter Y' by adding to Y' a subsequent blinding parameter different from $A_Y$ to produce a temporary blinded parameter, and then subtracting $A_Y$ from the temporary blinded parameter. In other embodiments, the product Z, or a blinded version of Z, is used as input to a cryptographic engine.

There is additionally provided, in accordance with an embodiment that is described herein, a method including, in a multi-word multiplier circuit receiving a first parameter X including one or more first words, and a second parameter Y' including multiple second words. The second parameter includes a blinded version of a non-blinded parameter Y that is blinded using a blinding parameter $A_Y$ so that $Y'=Y+A_Y$. A product $Z=X \cdot Y$ is calculated by summing multiple sub-products, each of the sub-products is calculated by multiplying a first word of X by a second word of Y', and subtracting from intermediate temporary sums of the sub-products respective third words of a partial product $P=X \cdot B_Y$, $B_Y$ is a blinding word included in $A_Y$.

These and other embodiments will be more fully understood from the following detailed description of the embodiments thereof, taken together with the drawings in which:

DETAILED DESCRIPTION OF EMBODIMENTS

Overview

Figure 1:
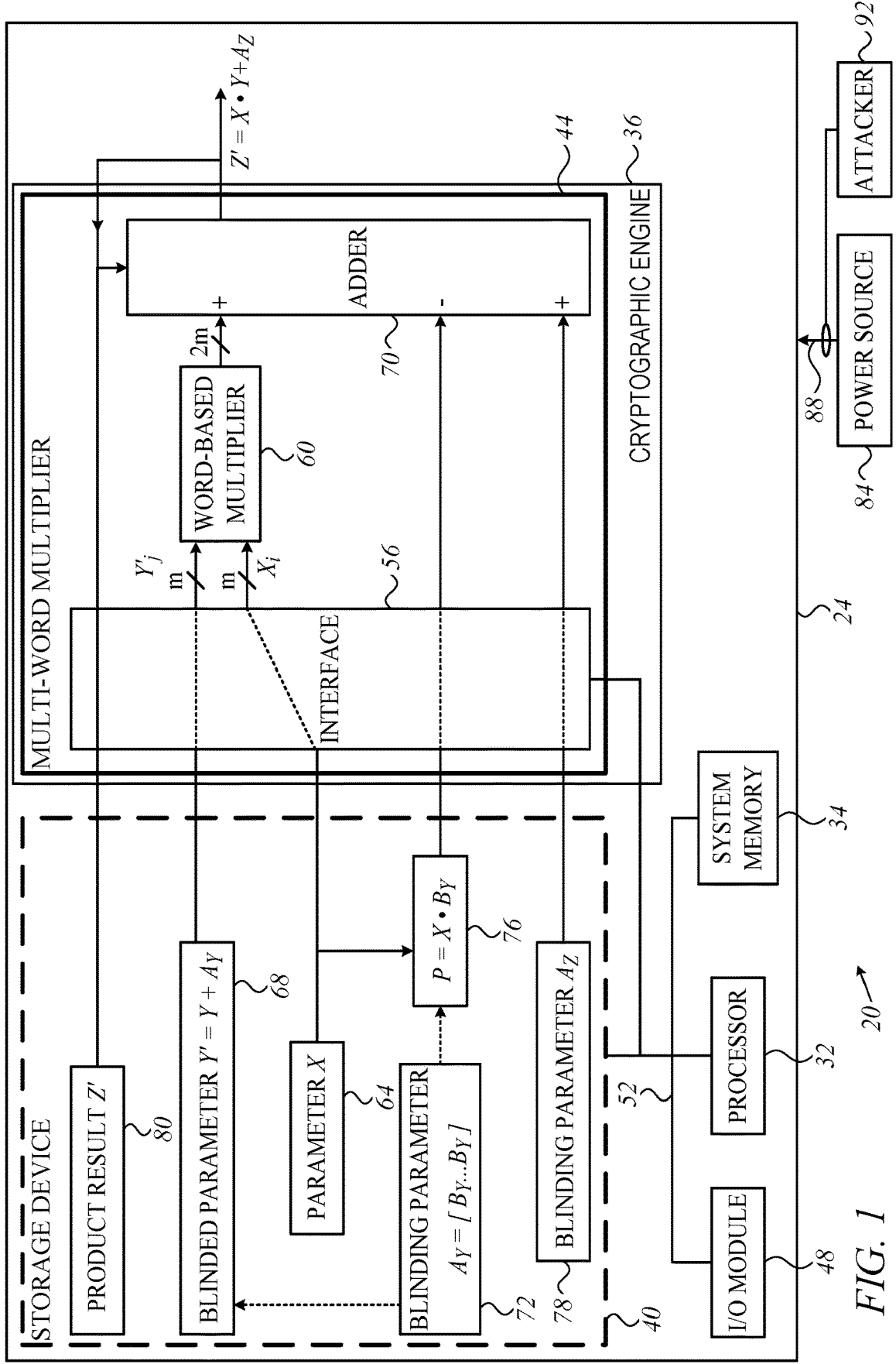
FIG. 1 is a block diagram that schematically illustrates a cryptosystem protected against power analysis attacks, in accordance with an embodiment that is described herein.

Embodiments that are described herein provide improved methods and systems for protecting a cryptosystem against power analysis attacks. In the disclosed embodiments, a (e.g., secret) parameter is modified in a recoverable manner before being used as input to a cryptographic operation. A secret parameter is typically modified in this manner prior to each cryptographic operation in which it is used. Such a modification is also referred to as "blinding" and the modified parameter is also referred to as a "blinded parameter."

Consider, for example, a cryptographic device that applies a cryptographic function $f(\cdot)$ to a parameter $X_{in}$, i.e., the cryptographic device is required to calculate $X_{out}=f(X_{in})$. To conceal the values of $X_{in}$ and $X_{out}$, $X_{in}$ can be modified into a blinded parameter denoted $X_{in}'$ calculated using a suitable blinding function E as $X_{in}'=E(X_{in})$. In this case, the output $X_{out}'=f(X_{in}')$ of the cryptographic function is blinded, and the non-blinded output $X_{out}$ can be recovered by applying to $X_{out}'$ a suitable reverse blinding function E' so that $X_{out}=E'(X_{out}')$. Note that E' is not necessarily an inverse function of E. The operation applied by the blinding function E may be, for example, adding some random value R to $X_{in}$, i.e., $X_{in}'=X_{in}+R$, wherein R is selected randomly.

In the disclosed embodiments, a cryptographic device is required to calculate the product of two parameters denoted X and Y, each comprising multiple m-bit words. Assuming that for security purposes the parameter Y is given in a blinded form $Y'=Y+A_Y$, the calculation of the product $X \cdot Y$ can be carried out indirectly by calculating $X \cdot Y=X \cdot Y'-X \cdot A_Y$.

In the disclosed embodiments, a multi-word multiplication is performed by an m-by-m multiplier, also referred to as a "word-based multiplier." Using the word-based multiplier, the overall multi-word multiplication is carried out by calculating multiple sub-products between m-bit words of the respective input parameters. Assuming that the input parameters to be multiplied comprise n m-bit words, calculating the product as $X \cdot Y' - X \cdot A_Y$ requires on the order of $(2 \cdot n^2)$ m-by-m multiplication operations.

Although in the embodiments that will be described below we refer mainly to decomposing the multiplication of large numbers into m-by-m multiplication operations, in alternative embodiments, a basic multiplication operation of an m-bit word by an n-bit word, wherein n≠m, can also be used. When a parameter such as X or Y is not an integer multiple of m (or n) it can be padded with one or more most-significant zero bits to complete the parameter size to an integer multiple of the underlying word size.

In the disclosed embodiments, the blinding parameter $A_Y$ for Y is constructed from an m-bit blinding word denoted $B_Y$, i.e., the blinding parameter for Y is of the form $A_Y=[B_Y, B_Y, \ldots, B_Y]$. The number of m-bit words in $A_Y$ is larger than the number of m-bits words in Y. By using this special structure, the expression $X \cdot A_Y$ can be calculated efficiently using only a number on the order of n m-by-m multiplication operations (compared to a number on the order of $n^2$ multiplication operations for an arbitrary blinding parameter), by pre-calculating $X \cdot B_Y$ once, and subtracting shifted versions of $X \cdot B_Y$ to intermediate results, as will be described in detail below. The product result or a blinded version of the product result may be used, for example, as an input to a cryptographic engine.

In some embodiments, the multi-word multiplier accumulates the sub-products and subtracts the m-bit words of the partial product in an interleaved and permuted order that does not reveal intermediate results that would have been produced in a direct product calculation.

In some embodiments, the multi-word multiplier carries out the product calculation iteratively in a manner that renders the non-blinded parameter Y irrecoverable from sensing of the power-supply inputs during calculation of the product.

Let Z denote the product $Z=X \cdot Y$, and let Z' denote a blinded version of Z. In some embodiments, the multi-word multiplier calculates a blinded version $Z'=Z+A_Z$ of the product Z, using a respective product blinding parameter $A_Z=[B_Z, B_Z, \ldots, B_Z]$, by adding an m-bit word $B_Z$ of $A_Z$ to a sub-product of an m-bit word of X by an m-bit word of Y'.

In an embodiment, the cryptographic device (or multi-word multiplier) updaters the blinded parameter by adding to Y' a subsequent blinding parameter, different from $A_Y$, so as to produce a temporary blinded parameter, and then subtracting $A_Y$ from the temporary blinded parameter.

In the disclosed techniques, a multi-word multiplier calculates a product of first and second parameters, wherein at least the second parameter is blinded. The product calculation is decomposed into word-based multiplications in a manner that does not reveal the non-blinded value of the second parameter, nor intermediate results that would have been produced by direct multiplication. As a result, the disclosed cryptographic device is effectively protected against power analysis attacks. The product calculation is carried out efficiently, resulting in latency comparable to direct multiplication.

System Description

FIG. 1 is a block diagram that schematically illustrates a cryptosystem 20 protected against power analysis attacks, in accordance with an embodiment that is described herein. In the example of FIG. 1, cryptographic system 20 comprises a cryptographic device 24, which comprises a processor 32, a system memory 34 of the processor, a cryptographic engine 36, a cryptographic storage device 40, a multi-word multiplier 44, and an I/O module 48, which are interconnected using a suitable bus 52. In the example of FIG. 1, multi-word multiplier 44 is comprised within cryptographic engine 36.

Cryptosystem 20 can be used in various applications that handle data in a secured manner. For example, cryptosystem 20 can provide cryptographic services such as, for example, data confidentiality, integrity and authentication, to name a few.

Cryptographic engine 36 typically implements a suite of cryptographic functions such as those required for evaluating keys related to the Rivest-Shamir-Adleman (RSA) method.

Cryptographic storage device 40 stores, for example, program instructions to be executed by processor 32 and data to be manipulated by cryptographic engine 36. Cryptographic storage device 40 may comprise multiple memory devices (not shown) of which at least some are accessible in parallel. Each of the memory devices comprised in cryptographic storage device 40 may be of any suitable storage technology such as Read Only Memory (ROM), Random Access Memory (RAM), Nonvolatile Memory (NVM) such as Flash memories, or any other suitable storage technology. Specifically, different memory devices within cryptographic storage device 40 may be of different respective memory types.

Multi-word multiplier 44 comprises an interface 56 for accessing certain information in cryptographic storage device 40. Interface 56 typically comprises one or more address registers and other logic (not shown) for pointing to relevant addresses in the cryptographic storage device, as well as data registers (not shown) for storing parameters that are required locally for efficient multiplication operation.

Multi-word multiplier 44 comprises a word-based multiplier 60 that accepts two m-bit inputs and generates a respective 2m-bit sub-product. In the present example, multi-word multiplier 44 multiplies a parameter denoted X 64 with a parameter denoted Y' 68. Typically, each of the input parameters X and Y' comprises multiple m-bit words denoted $X_i$ and $Y'_j$, respectively. The multi-word multiplier calculates sub-products of the form $X_i \cdot Y'_j$, and accumulates these sub-products with proper m-bit shifts using an adder 70 that supports both addition and subtraction operations. In some embodiments, the multi-word multiplier stores intermediate accumulated results in the cryptographic storage device, to be used in subsequent calculations.

Parameter Y' 68 is only available in a blinded form of the respective non-blinded parameter Y, so that Y' is derived from Y by the addition of a blinding parameter $A_Y$ 72, i.e., $Y'=Y+A_Y$. In some embodiments, for efficient calculation of the product $X \cdot Y$, the blinding parameter for Y is configured as a concatenation of multiple instances of a m-bit blinding word denoted $B_Y$ with m-bit shifts, i.e., $A_Y=[B_Y, B_Y, \ldots, B_Y]$. The blinding parameter $A_Y$ should have a number of m-bit words larger than the number of m-bit words in Y. The blinding word additionally serves for calculating a partial product P 76 given by $P=X \cdot B_Y$, e.g., as a pre-multiplication phase. In calculating the product $A \cdot Y$, adder 70 subtracts from temporary results of the $X \cdot Y'$ product m-bit words of P with selected m-bit shifts, so as to derive the product result $X \cdot Y$.

In some embodiments, cryptographic device 24 is required to store the product result $X \cdot Y$ in a blinded form. In such embodiments, adder 70 adds to the sub-products, m-bit words extracted from a product blinding parameter $A_Z$ 78. The blinded product result is given by $Z'=X \cdot Y + A_Z$. In some embodiments, $A_Z$ is comprised from a blinding m-bit word $B_Z$ similarly to the blinding scheme of Y described above. In this case only $B_Z$ needs to be stored rather than the entire blinding parameter $A_Z$. In the example of FIG. 1, cryptographic device 24 stores intermediate results produced by the multi-word multiplier, as well as the final blinded product, in a product result parameter 80 in cryptographic storage device 40.

In cryptosystem 20, cryptographic device 24 is powered using a power source 84, via one or more power lines 88. Power source 84 comprises, for example, an electrical battery or a power supply module. Power source typically provides one or more Direct Current (DC) voltages to be used by respective elements within cryptographic device 24. Power lines 88 are typically coupled electrically and mechanically to the power source at one end, and to the cryptographic device at the other end, using suitable connectors. Power source 84, power lines 88 or both, are typically not protected and may be accessible to an attacker 92.

The instantaneous power consumed by cryptographic device 24 typically varies as a function of the underlying calculations carried out, e.g., by cryptographic engine 36 and/or multi-word multiplier 44. Attacker 92 can monitor the power consumption over some period of time in an attempt to reveal secret information. For example, attacker 92 may perform a DPA attack by statistically analyzing multiple samples of the power consumption of cryptographic device 24. In the context of the present disclosure, the term "power consumption" refers to any measureable physical attribute related to the power consumption such as energy, voltage or electrical current.

In cryptosystem 20, the multiplication operation carried out by multi-word multiplier 44 is designed so that the multi-word multiplier calculates the product $X \cdot Y$ efficiently without exposing the non-blinded value Y in intermediate results, as will be described below. As a result, attacker 92 is unable to reconstruct Y by monitoring power lines 88 or power source 84.

Efficient Mult-Word Blinded Multiplication

In the context of the present disclosure, the term "blinded multiplication" refers to a multiplication operation between two parameters of which at least one parameter is blinded. Let the non-blinded parameters X and Y comprise respective numbers Lx and Ly of m-bit words. Given the blinding parameter $A_Y$ for Y, its respective blinded version Y' is given by:

$$Y' = Y + A_Y \qquad \text{Equation 1}$$

The blinding parameter $A_Y$ comprises a number of m-bit words that is larger than Ly by one or more m-bit words. This is required for protecting cryptosystem 20 against a statistical attack on the most significant bits of Y, as explained herein. When the length of both Y and $A_Y$ is n words, and the Most Significant Bit (MSB) of Y equals 1, a carry bit propagates into the $(n+1)^{th}$ word of Y' of Equation 1. This carry bit could be inferred using power analysis techniques. In terms of X, Y' and $A_Y$, the product $X \cdot Y$ can be written as:

$$Z = X \cdot Y = X \cdot Y' - X \cdot A_Y \qquad \text{Equation 2}$$

In order to calculate Equation 2 efficiently, the blinding parameter is defined using a single m-bit blinding word denoted $B_Y$. Specifically, the blinding parameter $A_Y$ is constructed by padding multiple instances of the blinding word with m-bit shifts, i.e., $A_Y = [B_Y, B_Y, \ldots, B_Y]$. Assuming that the length of Ay (in m-bit words) is Ly+1, $A_Y$ is given by:

$$A_Y = \sum_{j=0}^{Ly} B_Y \cdot 2^{mj} \qquad \text{Equation 3}$$

The blinding word $B_Y$ can have any suitable value other than the all-ones m-bit word. This limitation prevents carry bit propagation beyond the $(n+1)^{th}$ word. Since the $j^{th}$ word of Y is given by $Y_j = (Y'_j - B_Y)$, Equation 2 can be rewritten as:

$$Z = X \cdot Y = \sum_{i=0}^{Lx-1} \sum_{j=0}^{Ly} X_i \cdot (Y'_j - B_Y) \cdot 2^{m(i+j)} \qquad \text{Equation 4}$$

Equation 4 can be further decomposed as:

$$Z = X \cdot Y = \sum_{i=0}^{Lx-1} \sum_{j=0}^{Ly} X_i \cdot Y'_j \cdot 2^{m(i+j)} - \sum_{j=0}^{Ly} 2^{mj} (X \cdot B_Y) \qquad \text{Equation 5}$$

In accordance with Equation 5, the product calculation comprises a double sum over all sub-products $X_i \cdot Y'_j$ with proper m-bit shift values $2^{m(i+j)}$ and an additional sum over shifted versions of the partial product $P=(X \cdot B_Y a)$ with proper m-bit shift values $2^{mj}$. The double sum in Equation 5 requires $Lx \cdot (Ly+1)$ m-by-m multiplication operations, whereas the second sum requires only (Ly+1) multiplication operations for calculating $P=(X \cdot B_Y)$ once. An efficient multi-word multiplier circuit based on the decomposition of Equation 5 will be described in detail below, with reference to FIG. 3.

Next we provide an example blinded multiplication operation. For the sake of clarity, the numbers in the example are represented in a decimal base, in which case powers of the factor $2^m$ as used in the binary base are replaced with powers of 10. The values to be multiplied in the example are X=721 and Y=347, which results in the product $Z=X \cdot Y=250187$. In describing the example, $Y_k$ denotes the $k^{th}$ decimal digit of Y, and $Y'_k$ denotes the $k^{th}$ decimal digit of Y'. The blinding word in this example is $B_Y=2$ and the blinding parameter is $A_Y=2222$.

In a direct calculation: $Z=\Sigma_{k=0}^{2} X \cdot Y_k \cdot 10^k$ which gives $721 \cdot 7 + 721 \cdot 4 \cdot 10 + 721 \cdot 3 \cdot 100 = 250187$. The direct calculation generates the intermediate results 5047 and 5047+ 28840=33887.

A blinded product calculation can be carried out as $Z=\Sigma_{k=0}^{3} X \cdot Y'_k \cdot 10^k + \Sigma_{k=0}^{3} -X \cdot B_Y \cdot 10^k$. By summing sub-products in a non-permuted interleaved manner we get: 721·9– 1442+721·6·10–14420+721·5·100–144200+721·2·1000– 1442000. In this non-permuted interleaved order, each calculation of a sub-product $X \cdot Y'_k$ is followed by subtracting $X \cdot Y'_k \cdot 10^k$. The intermediate results in this case are {6489, 5047, 48307, 33887, 394387, 250187, 1692187} and the final result is 250187. As seen, this order calculations undesirably reveals the intermediate results 5047 and 33887 of the direct calculation.

The blinded calculation can be alternatively carried out in a permuted interleaved order such as, for example, 721·9+ 721·6·10–1442+721·5·100–14420+721·2·1000–144200–

1442000. In this example, $X \cdot Y'_0 + X \cdot Y'_1 \cdot 10$ is calculated before the subtraction of the shifted partial product $X \cdot B_Y$. In this case the intermediate sums are {6489, 49749, 48307, 408807, 394387, 1836387, 1692187} and the result is again 250187. Note that by calculating the product using this permuted interleaved order, the intermediate results of the direct calculation are not exposed. The specific permuted interleaved order of calculations in the above example is not mandatory, and any other suitable interleaving and permutation order of summing the sub-products can also be used.

Blinded Product with Varying Blinding Parameter

Figure 2:
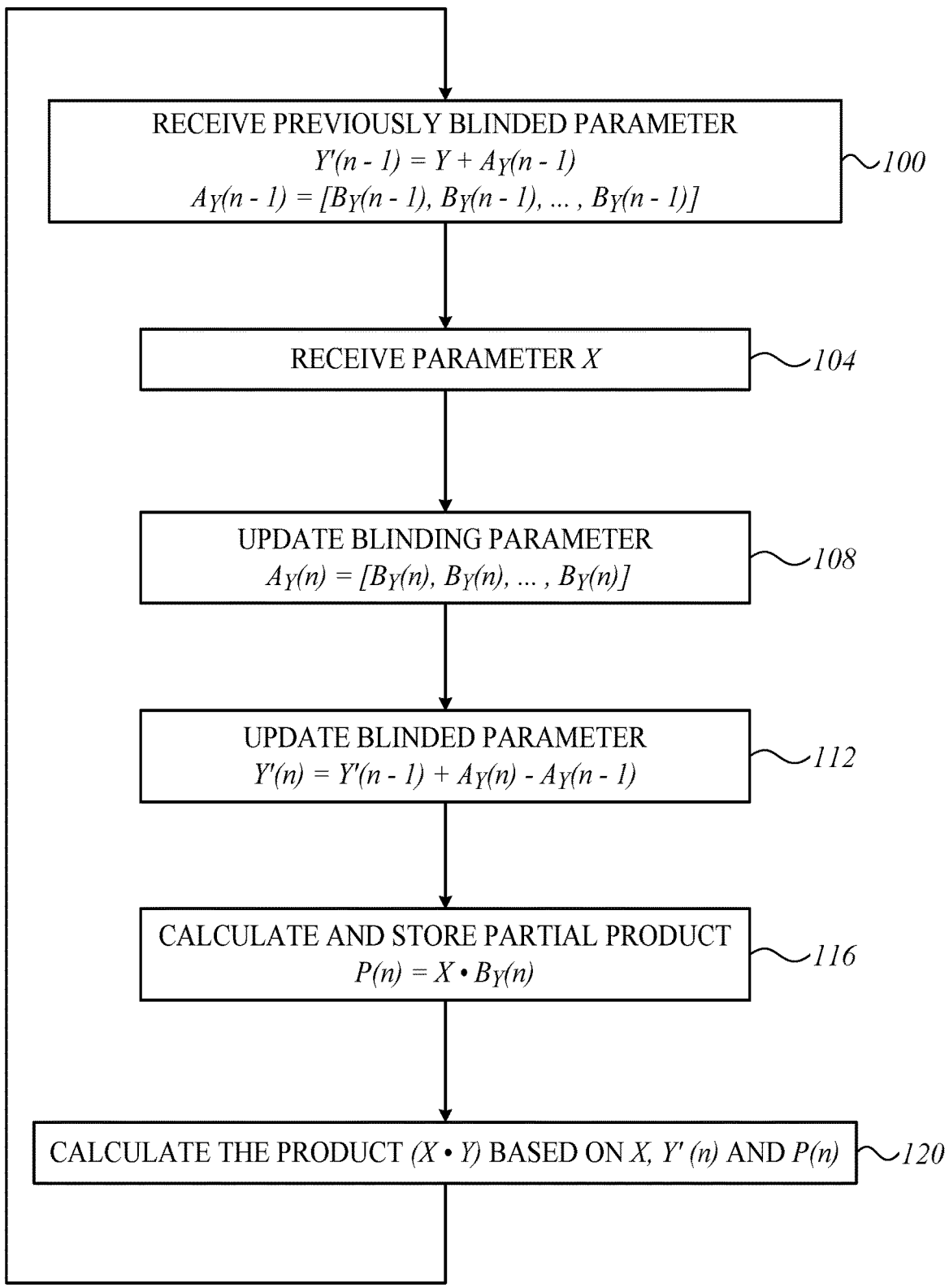
FIG. 2 is a flow chart that schematically illustrates a method for calculating blinded products using a varying blinding parameter, in accordance with an embodiment that is described herein.

FIG. 2 is a flow chart that schematically illustrates a method for calculating blinded products using a varying blinding parameter, in accordance with an embodiment that is described herein. The method will be described as carried out by various elements of cryptographic device 24 of FIG. 1.

At a first parameter initialization step 100, the cryptographic device prepares a multi-word parameter $Y'(n-1)$ that was blinded based a non-blinded parameter Y using a blinding parameter $A_Y(n-1)$ derived from a blinding m-bit word $B_Y(n-1)$. The symbol n denotes a sequential time index. The blinding of Y is based, for example on Equations 2 and 3 above. Associated with $B_Y(n-1)$ is a partial product $P(n-1)$ that was calculated by multiplying a previous parameter X by $B_Y(n-1)$. At a second parameter initialization step 104, the cryptographic device prepares a non-blinded multi-word parameter X. In an embodiment, at steps 100 and 104 the cryptographic device receives the respective parameters via I/O module 48. Alternatively, at least one of the parameters X and $Y'(n-1)$ is generated by processor 32, cryptographic engine 36 or both. The cryptographic device stores the parameters X and $Y'(n-1)$ in cryptographic storage device 40, at respective storage spaces 64 and 68. The cryptographic device also stores the blinding parameter $A_Y(n-1)$ in storage space 72 of cryptographic storage device 40.

At a blinding parameter updating step 108, the cryptographic device generates an updated blinding parameter $A_Y(n)$ In an example embodiment, the cryptographic device generates an updated blinding m-bit word $B_Y(n)$ in a random or pseudo-random manner, using any suitable randomization method, and concatenates multiple m-bit shifted versions of $B_Y(n)$ to generate the updated blinding parameter $A_Y(n)$, as given in Equation 3.

At a re-blinding step 112, the cryptographic device re-blinds the parameter Y by adding the updated blinding parameter $A_Y(n)$ to $Y'(n-1)$ and then subtracting the previous blinding parameter $A_Y(n-1)$. Note that using this updating scheme, $A_Y(n-1)$ is not subtracted directly from $Y'(n-1)$ because such subtraction would undesirably expose the value of Y.

At a partial product calculation step 116, the cryptographic device calculates the updated partial product $P(n)=X \cdot B_Y(n)$ using the updated blinding m-bit word of step 108. The cryptographic device stores the calculated partial product in a storage space 76 of the cryptographic storage device.

At a product calculation step 120, the cryptographic device calculates the product $X \cdot Y$. For example, the cryptographic device configures interface 56 of multi-word multiplier 44 to access X, $Y'(n)$ and $P(n)$ in the respective storage spaces in cryptographic storage device 40, and to use storage space 80 of the cryptographic storage device for output the product result. The cryptographic device then triggers the multi-word multiplier to perform the multiplication operation, e.g., based on Equation 5 above.

Following step 120, the method loops back to step 100 to receive a subsequent blinded parameter to be multiplied by another (or same) parameter X.

Although in the method of FIG. 2, the cryptographic device re-blinds Y prior to each multi-word multiplication, this is not mandatory, and in alternative embodiments the cryptographic device may re-blind Y selectively, i.e., once per a predefined number of multiplication operations, or using any other sampling method.

Hardware Implemented Multi-Word Multiplier

Figure 3:
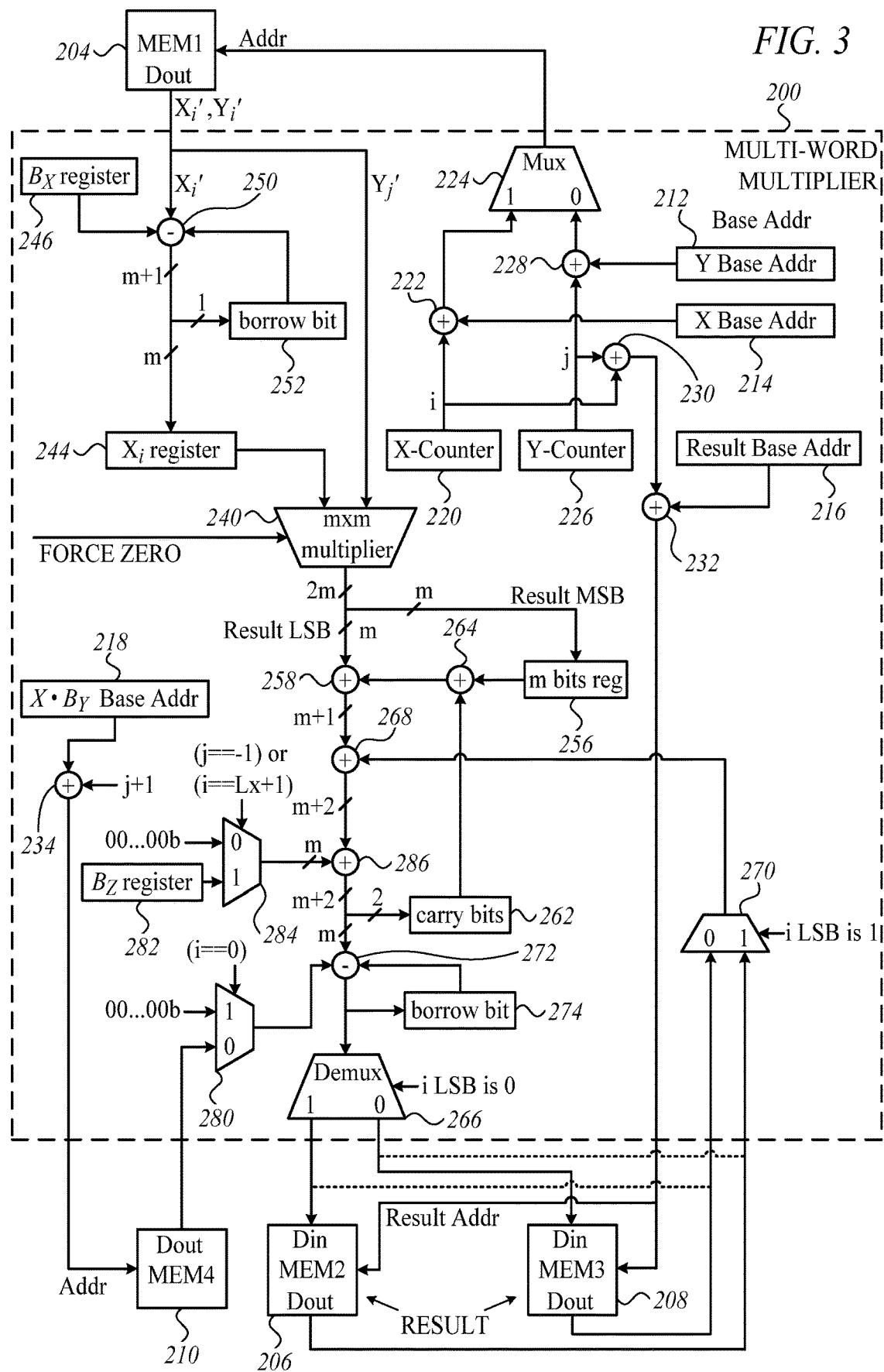
FIG. 3 is a block diagram that schematically illustrates a multi-word multiplier implemented in hardware, in accordance with an embodiment that is described herein.

FIG. 3 is a block diagram that schematically illustrates a multi-word multiplier 200 implemented in hardware, in accordance with an embodiment that is described herein. Multi-word multiplier 200 can be used, for example, in implementing multi-word multiplier 44 of cryptographic device 24 of FIG. 1.

In the example of FIG. 3, multi-word multiplier 200 interfaces memories 204, 206, 208 and 210 for reading input parameters and outputting intermediate and final results, as will be described in detail below. In the present example, each of memories 204, 206, 208 and 210 is accessible in data units of an m-bit word. Therefore, a parameter having m·W bits occupies W entries in the respective memory. Memories 204, 206, 208 and 210 are denoted MEM1, MEM2, MEM3 and MEM4, respectively.

Memory MEM1 stores input parameters denoted X' and Y'. In the present example, for improved level of secrecy, the input parameters are both stored externally to the multi-word multiplier as blinded parameters, using respective blinding parameters, i.e., $X'=A_X$ and $Y'=Y+A_Y$, wherein X and Y are the non-blinded parameters from which X' and Y' were derived, and $A_X$ and $A_Y$ are the respective blinding parameters.

The blinding parameters are constructed by padding respective blinding m-bit words $B_X$ and $B_Y$ as $A_X=[B_X, B_X, \ldots, B_X]$ and $A_Y=[B_Y, B_Y, \ldots, B_Y]$. Let Lx and Ly denote the respective lengths of X and Y, in units of an m-bit word. $A_X$ is contracted by padding Lx+1 instances of $B_X$ and $A_Y$ is contracted by padding Ly+1 instances of $B_Y$.

Multi-word multiplier 200 comprises a Y base address register 212, an X base address registers 214, a result base address register 216 and a partial product base address register 218. Y base address register 212 and X base address register 214 point respectively to the first m-bit word of Y' and X' in MEM1. Result base address register 216 points to the first m-bit word of the multiplication result that will be placed in one of memories MEM2 and MEM3. Partial product base address register 218 points to the first m-bit word of the partial product $X \cdot B_Y$ in memory MEM4. The partial product is assumed to be calculated and stored in MEM4 beforehand. The partial product $X \cdot B_Y$ can be calculated, for example using multi-word multiplier 200. Alternatively, the partial product can be calculated using processor 32 or using any other suitable means.

An X-Counter 220 produces an index 'i' in the range i=0 ... (Lx+1). The value of index 'i' is added to the value in X base address register using an adder 222 to produce an address value that is routed via a multiplexer 224 for accessing X' in MEM1. Similarly, a Y-Counter 226 produces an index 'j' in the range j=0 ... (Ly+1) when i=0, and in the range j=-1 ... (Ly+1) when i>0. The index 'j' is added to the value in Y base address register using an adder 228 to produce an address value that is routed via multiplexer 224 for accessing Y' in MEM1.

X-counter 220 and Y-counter 226 increment in accordance with clock cycles generated using a suitable clocking circuit (not shown). In some embodiments, the Y-counter increments once per each clock cycle, and returns to zero or to −1 after reaching the value Ly+1. The X-counter (index 'i') increments after the Y-counter (index 'j') reaches the value Ly+1, and returns to zero after reaching the value Lx+1. Alternatively other suitable counting schemes for Y-counter 226 and X-counter 220 can also be used.

An adder 230 sums the indices of X-counter and Y-counter to produce the sum-index (i+j), which is added using an adder 232 to that value in result base address of register 216 to produce an address for accessing the (i+j)$^{th}$ m-bit word of the multiplication result (or intermediate results) in MEM2 or MEM3. An adder 234, adds an index value (j+1) to the partial product value in base address of register 218 for accessing the j$^{th}$ m-bit word of the partial product $X \cdot B_Y$ in MEM4.

In the present example, multi-word multiplier 200 comprises a word-based multiplier 240, which applies a multiplication operation between two m-bit words to produce a 2m-bit output. Word-based multiplier 240 can be used for implementing word-based multiplier 60 of FIG. 1. Word-based multiplier 240 accepts an m-bit word $X_i$ of the non-blinded parameter X from a non-blinded input register 244, and another m-bit word $Y'_j$ of the blinded parameter Y' read from MEM1, and outputs a 2m-bit sub-product $X_i \cdot Y'_j$.

In some embodiments, word-based multiplier generates a sub-product result within one clock cycle. In other embodiments, generating a sub-product requires multiple clock cycles, in which case the clocking of the X-counter and Y-counter is inhibited accordingly. In some embodiments, the output of word-based multiplier is forced to zero in response to fulfilling one of the conditions j=−1, j=Lx+1 or i=Lx+1, as will be described below.

An X-blinding register 246 holds the blinding word $B_X$. Multi-word multiplier 200 reads an m-bit word $X'_i$ from MEM1, and calculates $X_i = X'_i - B_X - b$, using a subtraction module 250, wherein b is a borrow bit 252 generated in calculating the previous m-bit word $X_{i-1}$.

In an embodiment, the multi-word multiplier initializes X-counter 220 and Y-counter 226 to i=0 and j=0 (or j=−1), respectively. For a given index 'i', the multi-word multiplier calculates the non-blinded value $X_i$ as explained above, and stores $X_i$ in non-blinded input register 244. Then, the multi-word multiplier sequentially reads m-bit words $Y'_0 \ldots Y'_{Ly+1}$ from MEM1, and calculates respective sub-products $X_i \cdot Y'_j$ for j=0 . . . Ly+1. The multi-word multiplier stores the m Most Significant Bits (MSB) of each sub-product in an MSB register 256.

To calculate an intermediate result $X_i \cdot Y'$, the multi-word multiplier accumulates consecutive sub-products, using an adder 258, by adding the m Least Significant Bits (LSB) of the sub-product $X_i \cdot Y'_j$ to the content of MSB register 256 that holds the m MSB of $X_i \cdot Y'_{j-1}$. In accumulating the sub-products, carry bits 262 generated in previous calculations are added to the m-bit value read from MSB register 256 using an adder 264, and the MSB part of $X_i \cdot Y'_j$ is stored in MSB register 256 to be used in one or more subsequent calculations.

To accumulate the intermediate results $X_i \cdot Y'$ over i=0 . . . Lx, the multi-word multiplier alternately stores the accumulated intermediate results of $X_i \cdot Y'$ (with additional factors as will be described below) in MEM2 when index 'i' is even and in MEM3, otherwise. Selecting MEM2 or MEM3 for writing is controlled using a de-multiplexer 266 based on the LSB of index 'i'.

During the calculation of $X_i \cdot Y'$ as described above, the multi-word multiplier adds to $X_i \cdot Y'$, using an adder 268, the accumulated intermediate results of the form $\Sigma_k X_k \cdot Y' \cdot 2^{m \cdot k}$ up to k=i−1 read from MEM2 (or MEM3), and stores the updated accumulated result including $X_i \cdot Y'$ in the other memory MEM3 (or MEM2). Selecting the relevant memory MEM2 or MEM3 for read is controlled using a multiplexer 270 based on the LSB value of index 'i'. Note that prior to calculating the first intermediate result $X_0 \cdot Y'$, to be stored in MEM2, a number Lx of m-bit words to be read from MEM3 during the calculation of this first intermediate result are initialized to zero.

Note that the least significant word calculated at iteration index 'i' and stored in memory MEM2 (or MEM3) at the i$^{th}$ memory entry (relative to the base address) should be copied to the i$^{th}$ entry of MEM3 (or MEM2) for which the first calculated result will be stored in the (i+1)$^{th}$ entry. In an embodiment, this copy operation is carried out after the index 'j' has returned from j=Ly+1 to j=−1, but before the index 'i' is incremented to i+1, e.g., using one clock cycle for reading a word from MEM2 (or MEM3) and another clock cycle for writing the read word to the other memory MEM3 (or MEM2). Note that since in the scheme above, the copy operation occurs when j=−1 and before incrementing i, the word copied has an offset (i−1) relative to the result base address.

As explained above, e.g., with reference to Equation 5, the multi-word multiplier is required to subtract $X \cdot B_Y$ with proper m-bit shifts in order to calculate the desired product $X \cdot Y$. Multi-word multiplier 200 performs this subtraction operation in an interleaved manner using a subtraction module 272 that receives m-bit words of $X \cdot B_Y$ read from MEM4. The subtraction operation includes a borrow bit 274 generated and stored in a previous subtraction operation of subtraction module 272.

As noted above, when i>0 the index 'j' counts over the range j=−1 . . . Ly+1. The condition j=−1 forces the output of word-based multiplier to a zero value, and therefore when j=−1, the first m-bit word of $X \cdot B_Y$ read from MEM4 is subtracted from the first m-bit word read from MEM2 or MEM3 using subtraction module 272. The condition j=−1 (occurring when i>0) is also used for fetching $X'_i$ from MEM1 and storing the respective $X_i$ in non-blinded input register 244.

The condition j=Ly+1 also forces the output of the word-based multiplier to zero. In this clock cycle, the MSB of the recent sub-product $X_i \cdot Y'_{Ly}$ is stored in MEM2 or MEM3 depending on index 'i'.

A multiplexer 280 outputs toward subtraction module 272 m-bits words read from MEM4 when i>0, and a zero m-bit word when i=0. As a result, $X \cdot B_Y$ is actually subtracted only after the first intermediate result $X_0 \cdot Y'$ is fully calculated and stored in MEM2. In other words, $X \cdot B_Y \cdot 2^{mj}$ is effectively subtracted during the accumulation of $X_{i+1} \cdot Y'$. Such a permuted and interleave order of calculations assists in preventing the leakage of intermediate results of a direct multiplication $X \cdot Y$.

In some embodiments, multi-word multiplier 200 is required to store the product result in a blinded form. In such embodiments, the multi-word multiplier holds an m-bit blinding word $B_Z$ in a result blinding word register 282 to be used for calculating $Z' = X \cdot Y + _Z$, wherein $A_Z = [B_Z, B_Z, \ldots B_Z]$. A multiplexer 284 routes the value $B_Z$ when one of the conditions (j=−1) or (i=Lx+1) is true, or routes a zero m-bit word otherwise, to be added to the sub-product using an adder 286. The condition j==−1 in this case means, after the relevant word has been copied from MEM2 to MEM3 (or from MEM3 to MEM2), as described above, and 'i' has been incremented to i+1. The condition j==−1 is required for adding $B_Z$ after the $i^{th}$ iteration of calculating $X_i \cdot Y'$ completes. The condition i==Lx+1 is required for adding the last $B_Z$ when the entire multi-word multiplication calculation completes.

When X-counter 220 reaches the value i==Lx+1, the output of word-based multiplier 240 is forced to zero. In this clock cycle, the MSB m-bit word of $X \cdot B_Y$ read from MEM4 is subtracted from the relevant m-bit word of the intermediate result read from MEM2 or MEM3.

Word-based multiplier 240 of multi-word multiplier 200 can be implemented efficiently using any suitable method. In an example embodiment, word-based multiplier 240 is implemented as a systolic-array multiplier or as a Wallace tree multiplier. In some embodiments, the addition operations carried out by one or more of adders 258, 264, 268 and 286 can be implemented within the structure of the systolic-array of Wallace multiplier, e.g., by including within the multiplier one or more computational rows of full-adders.

The configurations of cryptosystem 20 and cryptographic device 24 of FIG. 1, and its components including multi-word multiplier 44, as well as multi-word multiplier 200 of FIG. 3, are example configurations, which are chosen purely for the sake of conceptual clarity. In alternative embodiments, any other suitable cryptosystem configuration and multi-word multiplier configuration can also be used.

The different elements of cryptographic device 24 and multi-word multipliers 44 and 200 may be implemented using any suitable hardware, such as in an Application-Specific Integrated Circuit (ASIC) or Field-Programmable Gate Array (FPGA). For example, word-based multiplier 240 may be implemented using a dedicated ASIC or FPGA, whereas other elements of multi-word multiplier 200 are implemented in another ASIC or FPGA.

In some embodiments, some elements of the cryptographic device and multi-word multiplier 44 may be implemented using software, or using a combination of hardware and software elements. For example, in an embodiment, processor 32 prepares parameters for multiplication, and multi-word multiplier 44 can apply the multiplication operation in hardware or in combination of software and hardware. As another example, multi-word multiplier 44 can be fully implemented in hardware as multi-word multiplier 200. In some embodiments, cryptographic engine 36 comprises a dedicated co-processor. In alternative embodiments, cryptographic engine 36 is implemented in hardware or in combination of hardware and software. Cryptographic storage device 40 comprises one or more memories such as, for example, Random Access Memories (RAMs).

Elements that are not necessary for understanding the principles of the present invention, such as various interfaces, control circuits, addressing circuits, timing and sequencing circuits and debugging circuits, have been omitted from the figures for clarity.

Typically, processor 32 in cryptographic device 24 comprises a general-purpose processor, which is programmed in software to carry out at least some of the functions described herein. The software may be downloaded to the computing device in electronic form, over a network, for example, or it may, alternatively or additionally, be provided and/or stored on non-transitory tangible media, such as magnetic, optical, or electronic memory.

In the context of the present disclosure and in the claims, the term "circuitry" refers to all the elements of multi-word multiplier 60 excluding interface 56, or all the elements of multi-word multiplier 200 excluding the elements via which the multi-word multiplier 200 interfaces memories 204, 206, 208 and 210. In multi-word multiplier 44 the circuitry comprises word-based multiplier 60 and adder 70. In multi-word multiplier 200, the circuitry comprises elements such as word-based multiplier 240, adders 258, 264, 268, 286, subtraction module 272, MSB register 256, X-counter 220, Y-counter 226, carry bits 262 and borrow bit 274.

Multi-word multiplier 200 of FIG. 3 can be used for implementing multi-word multiplier 44 in device 24 of FIG. 1. In such an embodiment, memories 204, 206, 208 and 210 are implemented in cryptographic storage device 40. Multi-word multiplier 200, interfaces memories 204, 206, 208 and 210 using various elements such as base address registers 212, 214, 216 and 218, X-counter 220, Y-counter 226, adders 222, 228, 230, 232, 234, multiplexers 224 and 270, and de-multiplexer 266.

The embodiments described above are given by way of example, and other suitable embodiments can also be used. For example, although multi-word multiplier 200 in FIG. 3 accumulates intermediate results of the form $X_i \cdot Y'$, this scheme is not mandatory, and other suitable schemes can also be used. For example, in alternative embodiments, multi-word multiplier 200 accumulates intermediate results of the form $X \cdot Y'_j$. Further alternatively, multi-word multiplier 200 of FIG. 3, as well as multi-word multiplier 60 of FIG. 1, may accumulate sub-products of the form $X_i \cdot Y'_j$ in any other suitable order.

As another example, although in the embodiment of FIG. 3, the multi-word multiplier reads the parameter X from memory 204 in a blinded form, in alternative embodiments, the parameter X is provided to the multi-word multiplier non-blinded. In such embodiments, X-blinding register 246, subtraction module 250 and borrow bit 252 may be omitted.

In the embodiments described above we have assumed that each of X and Y' comprises m-bit words, and that the multi-word multiplication is based on an m-by-m multiplier component for multiplying an m-bit word of X by an m-bit word of Y'. In alternative embodiments, Y' may comprise multiple n-bit words, wherein n≠m. In such embodiments, the m-by-m multiplier (e.g., multiplier 240 in FIG. 3) is replaced by an n-by-m multiplier, and the configuration depicted in FIG. 3 is modified accordingly.

Although the embodiments described herein mainly address protecting a cryptosystem against power analysis attacks, the methods and systems described herein can also be used in other applications, such as in any secured computing system that requires protection against power analysis attacks. Such a computing system may comprise an electronic device such as, for example, a smart phone, smart card, laptop, tablets, point of sale system, router, smart TV and the like.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A multi-word multiplier circuit, comprising:
   an interface configured to receive:
      a first parameter X comprising one or more first words; and
      a second parameter Y' comprising multiple second words, wherein the second parameter comprises a blinded version of a non-blinded parameter Y that is blinded using a blinding parameter $A_Y$ which is a concatenation of multiple instances of an m-bit blinding word $B_Y$, so $Y'=Y+A_Y$; and
   circuitry, including:
      a word-based multiplier configured to calculate sub-products in a plurality of iterations, wherein each of the sub-products is calculated by multiplying a first word of X by a second word of Y',
      an adder configured to sum the sub-products calculated by the word-based multiplier into intermediate temporary sums; and
      control circuits configured to control the word-based multiplier to calculate all the sub-products forming the product of the first parameter X and the second parameter Y', and to control the adder to sum all the sub-products, while subtracting from the intermediate temporary sums, in some of the iterations a partial product of the m-bit blinding word $B_Y$ and the first parameter X, so as to calculate the product of the first parameter X and the second parameter Y.

2. The multi-word multiplier circuit according to claim 1, wherein the circuitry is configured to consume electrical power provided thereto over one or more power-supply inputs, while rendering the non-blinded parameter Y irrecoverable from sensing of the power-supply inputs during calculation of the product.

3. The multi-word multiplier circuit according to claim 1, wherein the blinding parameter $A_Y$ comprises a number of bits larger than a number of bits in the non-blinded parameter Y.

4. The multi-word multiplier circuit according to claim 1, wherein the circuitry is configured to provide a function of the product of the first parameter X and the second parameter Y as an output of the multi-word multiplier circuit.

5. The multi-word multiplier circuit according to claim 1, wherein the circuitry is configured to sum the sub-products and to subtract the partial product in an interleaved and permuted order that does not reveal intermediate results produced in a direct product calculation.

6. The multi-word multiplier circuit according to claim 4, wherein the function of the product is used as input to a cryptographic engine.

7. The multi-word multiplier circuit according to claim 4, wherein the circuitry is configured to provide as the function of the product, a sum of the product and a second blinding parameter $A_Z$, wherein the circuitry is configured to add the second blinding parameter to the product by adding a plurality of words forming the second blinding parameter $A_Z$ in summing the sub-products.

8. The multi-word multiplier circuit according to claim 1, wherein the circuitry further includes a multiplexer configured to select between a zero value and the partial product, and wherein the adder receives an output of the multiplexer, for the subtracting.

9. A method of multiplying a first parameter X, including one or more first words, by a second parameter Y including multiple second words, comprising:
   blinding the second parameter Y, using a first blinding parameter $A_Y$, which is a concatenation of multiple instances of an m-bit blinding word $B_Y$, by forming a modified second parameter Y' calculated as $Y'=Y+A_Y$;
   in a multi-word multiplier circuit, receiving the first parameter X, and the modified second parameter Y';
   calculating by a word-based multiplier of the multi-word multiplier circuit multiple sub-products in a plurality of iterations, wherein each of the sub-products is calculated by multiplying a first word of X by a second word of Y';
   calculating a partial product as a product of the m-bit blinding word $B_Y$ and the first parameter X; and
   summing the sub-products, by an adder of the multi-word multiplier circuit, into intermediate temporary sums, while subtracting from the intermediate temporary sums in some of the iterations, the partial product, so as to generate the product of the first parameter X and the second parameter Y.

10. The method according to claim 9, wherein the multi-word multiplier circuit consumes electrical power provided thereto over one or more power-supply inputs, while rendering the non-blinded parameter Y irrecoverable from sensing of the power-supply inputs during calculation of the product.

11. The method according to claim 9, wherein the blinding parameter $A_Y$ comprises a number of bits larger than a number of bits in the non-blinded parameter Y.

12. The method according to claim 9, wherein summing the sub-products and subtracting the partial product are performed in an interleaved and permuted order that does not reveal intermediate results produced in a direct product calculation.

13. The method according to claim 9, and comprising providing a function of the product of the first parameter X and the second parameter Y as an output of the multi-word multiplier circuit.

14. The method according to claim 13, wherein providing the function of the product comprises providing a sum of the product and a second blinding parameter $A_Z$, wherein the second blinding parameter is added to the product by adding a plurality of words forming the second binding parameter in summing the sub-products.

15. The method according to claim 13, wherein providing a function of the product comprises providing the function of the product as input to a cryptographic engine.

* * * * *